Oct. 20, 1953 F. F. SLACK 2,656,462
STABLE DELAY CIRCUIT
Filed Oct. 11, 1945
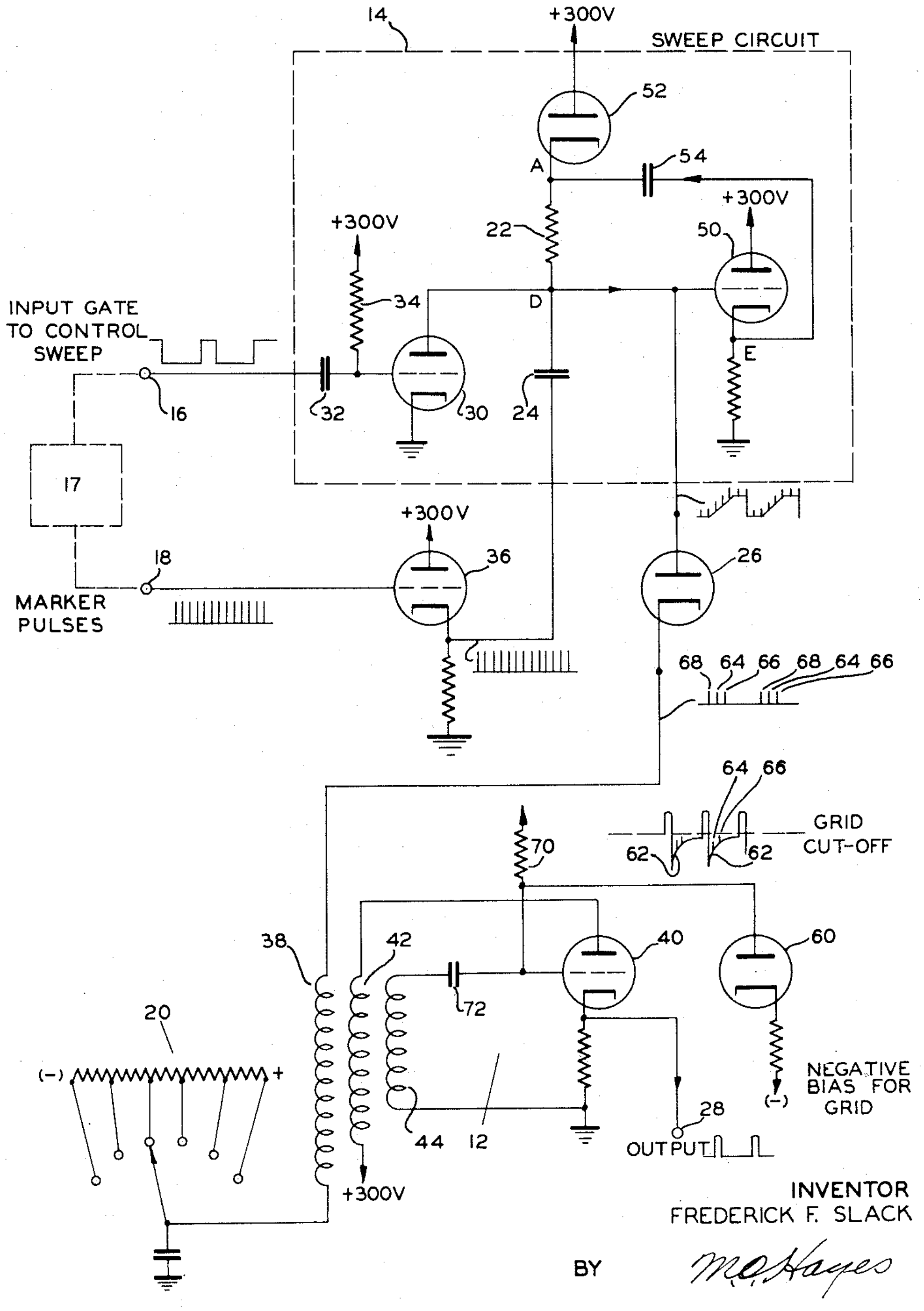
INVENTOR
FREDERICK F. SLACK
BY M. O. Hayes
ATTORNEY Patented Oct. 20, 1953

2,656,462

UNITED STATES PATENT OFFICE 2,656,462

STABLE DELAY CIRCUIT

Frederick F. Slack, Medford, Mass., assignor, by mesne assignments, to the United States of America as represented by the Secretary of the Navy Application October 11, 1945, Serial No. 621,833

5 Claims. (Cl. 250—27)

This invention relates to pulse circuits, and more particularly to adjustable delay circuits.

The primary object of the invention is to generally improve adjustable delay circuits.

A more particular object is to provide such a circuit in which the delay is adjustable in accurate increments which are stably maintained.

To accomplish the foregoing general objects, and more specific objects which will hereinafter appear, my invention resides in the method and circuit elements, and their relation one to the other, as are more particularly described in the following specification. This specification is accompanied by a drawing, the single figure of which is a wiring diagram of a preferred circuit embodying features of my invention.

Referring to the drawing, the apparatus comprises a triggerable circuit generally designated 12, and a sweeep circuit generally designated 14, said sweep circuit being shown in a dotted rectangle. The sweep circuit is controlled by an input gate or basic pulse applied at the terminal 16. The apparatus further comprises a source of timing pulses connected at 18, which pulses are used to measure increments of delay. These timing pulses are superposed on the sweep wave generated by sweep wave generator 14, and the superposed waves are supplied to the triggerable circuit 12 in order to trigger the same. Additional adjustable bias means, generally designated 20, is provided to control the number of delay timing pulses which will be submerged (together with the first part of the sweep wave) before a delay timing pulse triggers the circuit 12.

In the illustrated apparatus, the triggerable circuit 12 is a blocking oscillator of the one-cycle type. The sweep wave generator 14 is a saw-tooth wave generator, the RC circuit of which is indicated at 22 and 24. The delay timing pulses are marker pulses similar to range marks, and are generated at an accurate repetition rate in synchronism with the basic pulse or gate applied at the terminal 16. The adjustable means for controlling the delay includes a rectifier, specifically a diode 26, the cathode of which is biased by a potentiometer 20.

It will be understood that with this arrangement the first triggering potential to reach the blocking oscillator 12 through the diode 26 will be one of the marker pulses. This will be so regardless of slight changes in the slope of the saw-tooth wave, and regardless of slight departures from linearity. The delay obtained before production of each output pulse shown at the output terminal 28 will therefore be constant, and accurately maintained.

Considering the apparatus in greater detail, the saw-tooth wave generator 14 comprises a tube 30 the grid of which is connected to input terminal 16 through a coupling capacitor 32, and is connected to a positive source through resistor 34. The charging condenser 24, instead of being returned directly to ground, is connected to the cathode of a tube 36 the grid of which receives the marker pulses. The superposed waves are fed to diode 26, and thence to one coil 38 of the transformer of the blocking oscillator, and through said coil to the bias potentiometer 20. This is preferably provided with taps having increments of adjustment corresponding approximately to the spacing of the marker pulses, there being no need for a continuous fine adjustment.

The marker pulses supplied at terminal 18 may be generated in a conventional ringing oscillator or LC circuit triggered by the gate supplied at terminal 16. If desired, the marker pulses may be crystal controlled, but this complicates the supply circuits because of the need for synchronizing the gate and marker pulses. For example, a counter circuit may be used to step down the marker frequency to the gate frequency. A box 17 is shown to indicate generically the need for synchronization.

The blocking oscillator 12 may be conventional, the anode of tube 40 being connected to coil 42 of the transformer and thence to a source of positive anode potential. The grid of tube 40 is connected to the third coil 44 of the transformer, thus providing the desired regenerative coupling between the anode and grid circuits.

The sweep wave generator includes two additional tubes 50 and 52 which are not essential to the invention, but which may be beneficially used therewith. Tube 50 helps obtain linearity for the sweep. It acts to provide a feedback which varies the potential at the point A in accordance with the sweep voltage variation in such a manner that there is a constant difference potential between the points A and D during the sweep. This produces essentially constant charging current through the RC circuit, and therefore an improved linearity. The tube 50 is connected as a cathode follower, and acts as a sweep and feedback amplifier.

The diode 52 is employed in lieu of another resistor in series with the resistor 22. It makes possible saw-tooth sweep voltage of greater amplitude because the tube isolates the power supply during nearly all of the sweep period. The reason for this is that as the capacitor 24 charges, the point E rises in potential as does the point A, and at nearly the same rate. This is possible because the capacitor 54 retains substantially a constant charge during the sweep period, thus keeping the points A and E at a constant difference in potential. Shortly after the beginning of the sweep the point A rises above the potential at the anode of diode 52 thus isolating the RC section of the circuit from the power supply.

It will be seen that the effective sweep supply voltage at point A may thus become even higher than the original B supply voltage at the anode of the tube 52. It will equal the voltage across the capacitor 54 plus the potential at the point E.

At the end of each sweep the tube 30 clamps the capacitor 24 to ground and the point A quickly resumes its original quiescent voltage. The small amount of charge lost during each sweep by capacitor 54 is restored in the period between sweeps. Without the diode 52, and with too high a sweep repetition rate, this might not be entirely realized if a resistor were used instead of the diode 52 because of the difference in recharging impedances in the two cases. The use of diode 52 is not a novel feature of my invention, it being disclosed and claimed in an application of William A. Higginbotham, filed September 14, 1945, Serial No. 616,377 now Pat. No. 2,597,322.

The diode 60 makes the RC circuit 70, 72 less critical. It helps fix the recovery or negative excursion 62 of the blocking oscillator against drifting or wandering. This helps insure that marker pulses such as 64 and 66, subsequent to the trigger pulse 68, will not prematurely trigger the blocking oscillator.

It is believed that the apparatus of my invention, as well as its operation and advantages, will be apparent from the foregoing detailed description.

The delay timing pulses or marker pulses are superposed on the sweep wave. The position of the potentiometer 20 limits the amplitude of the sweep appearing at the diode. A change in potentiometer position changes the bias on the diode so that any desired number of pulses from the beginning of each sweep will be reached before the pulses reach the blocking oscillator through the diode. At the appearance of the first pulse of the series of remaining pulses of each sweep, the blocking oscillator is fired, its grid having previously been held below cut off by the negative bias applied through the diode 60. The subsequent pulses in the same series have no effect on the blocking oscillator because the grid is below cut off at the time that they appear. Thus the setting of the potentiometer determines the delay of the output pulses appearing at terminal 28 with respect to the input pulses, or the leading edges of the gates applied to the input terminal 16. The output pulses at terminal 28 will occur at the repetition rate of the basic pulse or gate and their delay is an integral multiple of the repetition period of the marker pulses. Inasmuch as the gate and the marker pulses are synchronized or derived from the same source, and inasmuch as the frequency of the marker pulses is stable, the delay obtained is accurately timed and stably maintained.

It will be apparent that while I have shown and described my invention in a preferred form, changes may be made without departing from the spirit of the invention, as defined in the following claims.

I claim:

1. A stable delay circuit comprising a block oscillator, a saw-tooth generator controlled by a periodically recurring base pulse, means to superpose synchronized accurately-timed marker pulses on the saw-tooth wave generated by the generator, a diode through which the superposed waves are fed to trigger the blocking oscillator, and a potentiometer to variably bias the diode in order to control the number of marker pulses which will be submerged before a marker pulse triggers the blocking oscillator.

2. A delay circuit comprising, means for periodically generating a base pulse, means synchronized with said base pulses for generating a positive slope saw-tooth wave at the same repetition frequency, means for superimposing on each of said saw-tooth waves a plurality of equally spaced, constant amplitude positive timing pulses, said timing pulses being synchronized with said base pulses, a diode, means coupling said superimposed pulses to said diode, adjustable bias means for said diode for selecting the first of said superimposed pulses on each of said saw-tooth waves to be passed by said diode, and a blocking oscillator responsive to each of said first passed superimposed timing waves.

3. A delay circuit comprising, means for periodically generating a base pulse, means synchronized with said base pulses for generating a saw-tooth wave at the same repetition frequency, means for superimposing on each of said saw-tooth waves a plurality of equally spaced, constant amplitude timing pulses synchronized with said base pulses, a diode, means for adjustably biasing said diode, means coupling said superimposed timing pulses to said diode, said diode passing at the repetition rate of said saw-tooth wave a controllable number of superimposed timing pulses on each saw-tooth wave, said number being controlled by said adjustable bias means, and a blocking oscillator responsive to the first passed superimposed timing pulse on each of said saw-tooth waves.

4. A stable delay circuit comprising, a positive slope saw-tooth wave generator controlled by a periodically recurring base pulse and comprising, first and second triode electron tubes each having an anode, a cathode and a control grid, a diode electron tube having an anode and a cathode, a first capacitor coupled between the control grid of said first triode and the source of said base pulses, a point of reference potential, a potential source positive with respect to said point of reference potential, a first resistor returning said control grid of said first triode to said positive potential source, a second resistor connected between the anode of said first triode and the cathode of said diode, means returning the anodes of said diode and said second triode to said source of positive potential, a second capacitor connected between the cathodes of said second triode and said diode, the anode of said first triode being directly connected to the control grid of said second triode, the cathode of said first triode being directly returned to said point of reference potential, and a third resistor returning the cathode of said second triode to said point of reference potential, means for coupling equally spaced, positive timing pulses synchronized with said base pulses to the anode of said first triode, there being a plurality of timing pulses for each base pulse, said last-mentioned means comprising a third triode having an anode, a control grid and a cathode, means for coupling said timing pulses to the control grid of said third triode, means returning the anode of said third triode to said source of positive potential, a fourth resistor returning the cathode of said third triode to said reference potential point and a third capacitor coupling said cathode of said third triode to the anode of said first triode, whereby there appears at the anode of said first triode a saw-tooth wave having a positive slope and periodically recurring at the pulse repetition frequency of said base pulse and having further a plurality of said positive timing pulses superimposed thereon, a second diode having a cathode and an anode connected to the anode of said first triode, means coupled to the cathode of said second diode for adjustably biasing said second diode, said diode passing at the repetition frequency of said saw-tooth wave a controllable number of adjacent superimposed timing pulses and blocking the remaining superimposed timing pulses, said number being controlled by said bias means, and a blocking oscillator responsive to each of said passed superimposed timing pulses adjacent to and following a blocked pulse for producing an output pulse in fixed phase relation therewith.

5. A pulse delay circuit, comprising in combination, a source of time-spaced base pulses, a triode having an anode and a cathode and control grid, a capacitor associated with said anode, means for linearly charging said capacitor, coupling means for applying said base pulses to said grid control element whereby said capacitor is periodically discharged through the interelectrode space path of said triode to produce thereby recurring positive slope saw-tooth waves having the same repetition frequency as the said base pulses, a source of precisely timed marking pulses synchronized with respect to said base pulses and having a frequency an integral multiple of said base pulse frequency, a second triode having an anode, cathode, control grid and cathode resistor, means for feeding said marking pulses to the control grid of said second triode, means connecting said first capacitor and said cathode resistor in series relationship whereby said precisely timed marking pulses are superimposed on the positive slope of the saw-tooth wave, a diode having an anode and a cathode, means associated with the cathode of said diode for adjustably biasing said diode, means for coupling said superimposed wave to the anode of said diode whereby said diode will pass a controllable number of adjacent superimposed marking pulses and block the remaining superimposed marking pulses, said number being selectively controlled by the said biasing means and a blocking oscillator coupled to the cathode of said diode so as to be triggered by the first passed superimposed marking pulse for generating output pulses in fixed phase relationship with said base pulses.

FREDERICK F. SLACK.

References Cited in the file of this patent

UNITED STATES PATENTS

| Number | Name | Date |
|---|---|---|
| 2,208,378 | Luck | July 10, 1940 |
| 2,233,275 | Wolff | Feb. 25, 1941 |
| 2,355,363 | Christaldi | Aug. 8, 1944 |
| 2,366,307 | Anderson | Jan. 2, 1945 |
| 2,405,238 | Seeley | Aug. 6, 1946 |
| 2,411,573 | Holst et al. | Nov. 26, 1946 |
| 2,422,204 | Meacham | June 17, 1947 |
| 2,422,205 | Meacham | June 17, 1947 |
| 2,428,926 | Bliss | Oct. 14, 1947 |
| 2,493,517 | Applegarth | Jan. 3, 1950 |
| 2,497,165 | Goldberg et al. | Feb. 14, 1950 |
| 2,526,595 | Watts, Jr. | Oct. 17, 1950 |
| 2,597,353 | MacNichol, Jr. | May 20, 1952 |

FOREIGN PATENTS

| Number | Country | Date |
|---|---|---|
| 487,982 | Great Britain | June 29, 1938 |